(12) United States Patent
Choi

(10) Patent No.: US 8,401,317 B2
(45) Date of Patent: Mar. 19, 2013

(54) METHOD AND APPARATUS FOR IMAGE DATA PROCESSING

(75) Inventor: Yong Seok Choi, Daejeon (KR)

(73) Assignee: Magnachip Semiconductor, Ltd., Cheongju-si (KR)

(*) Notice: Subject to any disclaimer, the term of this patent is extended or adjusted under 35 U.S.C. 154(b) by 981 days.

(21) Appl. No.: 12/143,750

(22) Filed: Jun. 20, 2008

(65) Prior Publication Data
US 2008/0317363 A1    Dec. 25, 2008

(30) Foreign Application Priority Data
Jun. 22, 2007   (KR) .................. 10-2007-0061581

(51) Int. Cl.
*G06K 9/36* (2006.01)
(52) U.S. Cl. ................................................ 382/236
(58) Field of Classification Search ........... 382/232–244
See application file for complete search history.

(56) References Cited

U.S. PATENT DOCUMENTS

| | | | |
|---|---|---|---|
| 6,795,581 B1* | 9/2004 | Nomura | 382/232 |
| 2003/0007693 A1* | 1/2003 | Yokose et al. | 382/233 |
| 2003/0113029 A1* | 6/2003 | McLaughlin | 382/244 |
| 2006/0233446 A1* | 10/2006 | Saito et al. | 382/232 |

FOREIGN PATENT DOCUMENTS

JP    2003-174561    6/2003

OTHER PUBLICATIONS

Japanese Office Action issued on Mar. 22, 2011, in corresponding Japanese Application No. 2008-160207 (4 pages).

* cited by examiner

*Primary Examiner* — Jingge Wu
(74) *Attorney, Agent, or Firm* — NSIP Law

(57) ABSTRACT

An image data processing apparatus includes an encoding unit, a storage unit, a decoding unit and a Digital-to-Analog (D/A) converter. The encoding unit receives image data, compares $(2n-1)$th pixel data with $(2n)$th pixel data, and creates a header value, an encoding value and a reference value, which are used to encode the pixel data. The storage unit is connected to the encoding unit, and stores the header value, the encoding value and the reference value, which are created by the encoding unit. The decoding unit is connected to the storage unit, and restores the $(2n-1)$th pixel data and the $(2n)$th pixel data using the header value, the encoding value and the reference value. The D/A converter is connected to the decoding unit, converts the restored image data into analog signals, and outputs the analog signals.

16 Claims, 7 Drawing Sheets

METHOD AND APPARATUS FOR IMAGE DATA PROCESSING

CROSS-REFERENCE TO RELATED APPLICATION

The benefit of priority of Republic of Korea patent application number 10-2007-0061581, which was filed Jun. 22, 2007, is claimed pursuant to 35 USC §119(a). Furthermore, the contents of Republic of Korea patent application number 10-2007-0061581 are hereby incorporated by reference in their entirety.

BACKGROUND

1. Introduction

The following description relates generally to an image data processing apparatus having a reduced size and an improved processing speed, and, for example, to an image data processing apparatus that performs processing by comparing the data of neighboring pixels at the time of encoding and decoding the image data, thereby reducing the size of a storage unit for storing image date and improving data processing speed.

2. Description of the Related Art

In general, a display device is a device for displaying captured images to the outside using a display panel. Such a display device requires an image processing apparatus for temporarily storing digital image date, converting the digital image data into analog data, and outputting the analog data, so as to display the digital image data.

Recently, with the increase in the use of display devices, the sizes of display devices become smaller and the processing speeds thereof become faster. In order to meet these trends, research into the implementation of an image data processing apparatus having a reduced size and improved processing speed has been widely conducted.

A prior art image data processing apparatus will be described below with reference to the accompanying drawings.

FIG. 1 is a block diagram showing the prior image processing apparatus, and FIG. 2 is a block diagram showing the memory of the prior art image data processing apparatus.

As shown in FIG. 1, the prior art image data processing apparatus includes an encoder 100 for compressing RGB data, memory 110 for storing the data compressed by the encoder 100, and a read decoder 140 and a scan decoder 120 for decoding and outputting the data stored in the memory 110.

The encoder 100 temporarily stores first RGB data in an internal buffer. When second RGB data is applied, the encoder 100 compares upper 4 bits of the first RGB data with respective upper 4 bits of the second RGB data. If the upper 4 bits of the first RGB data are identical to the upper 4 bits of the second RGB data, the upper 4 bits of the second RGB data are stored in RGB registers Base_R, Base_G and Base_B, as shown in FIG. 2.

Respective lower 2 bits of the first RGB data are stored in first registers O_R, O_G and O_B, respective lower 2 bits of the second RGB data are stored in second registers E_R, E_G, and E_B, and '11' is stored as flag bits.

If the upper 4 bits of the first RGB data are not identical to the upper 4 bits of the second RGB data, the respective upper 4 bits of the first RGB data are stored in the first and second registers O_R, O_G, O_B, E_R, E_G and E_B, and the respective upper 4 bits of the second RGB data are stored in the RGB registers Base_R, Base_G and Base_B. In this case, the respective lower 2 bits of the first and second RGB data are not stored, and '00' is stored as flag bits.

Furthermore, third RGB data and fourth RGB data, which are successively applied after the first RGB data and the second RGB data, are stored in the respective registers using the same method through the comparison of the data with the stored first and second RGB data, and '01' or '10' is stored as flag bits.

The restoration by the scan decoder 120 is performed by checking the flag bits, creating the upper 4 bits and lower 2 bits of the first and second RGB data using the data stored in the RGB registers Base_R, Base_G and Base_B and the first and second registers O_R, O_G, O_B, E_R, E_G and E_B, based on the flag bits, and restoring and outputting the compressed RGB data.

That is, if the flag bit is '11', the scan decoder 120 creates the upper 4 bits of the first and second RGB data using the data stored in the RGB registers Base_R, Base_G and Base_B, the lower 2 bits of the first RGB data using the data stored in the first registers O_R, O_G and O_B, and the lower 2 bits of the second RGB data using the data stored in the second registers E_R, E_G and E_B.

If the flag bit is '01', the scan decoder 120 creates the upper 4 bits of the third RGB data using the data stored in the RGB registers Base_R, Base_G and Base_B, the lower 2 bits of the third RGB data using the data stored in the first registers O_R, O_G and O_B, the upper 4 bits of the fourth RGB data using the data stored in the registers Base_R, Base_G, and Base_B, in which the previous first and second RGB data are stored, and the lower 2 bits of the fourth RGB data using the data stored in the second registers E_R, E_G and E_B.

If the flag bit is '00', the scan decoder 120 creates the upper 4 bits of the second RGB data using the data stored in the RGB registers Base_R, Base_G and Base_B, the upper 4 bits of the first RGB data using the data stored in the first and second registers O_R, O_G, O_B, E_R, E_G and E_B, and the lower 2 bits of the first and second RGB data through the selection of one from among '00', '01' and '10' in consideration of the gamma characteristics of a display panel.

The prior art image data processing apparatus requires two pieces of previous data in order to compress the data of two current pixels at the time of encoding. Accordingly, a total of four pieces of data must be stored and processed at the time of encoding and decoding the data, and thus a register and a comparator are required. As a result, the size of the prior art image data processing apparatus increases, and the time required for the processing of data increases because a large amount of data is processed.

SUMMARY

Accordingly, of the teachings provided herein by the following description provide an image data processing apparatus that may perform processing by comparing only the data of two neighboring pixels, thereby enabling the size of a storage unit for storing image data to be reduced and enabling data processing speed to be improved.

In one general aspect, there is provided an image data processing apparatus, including an encoding unit for receiving image data, comparing (2n−1)th pixel data with (2n)th pixel data, and creating a header value, an encoding value and a reference value, which are used to encode the pixel data; a storage unit connected to the encoding unit, which can which can store the header value, the encoding value and the reference value, which are created by the encoding unit; a decoding unit connected to the storage unit, which can which can restore the (2n−1)th pixel data and the (2n)th pixel data using the header value, the encoding value and the reference value; and a Digital-to-Analog (D/A) converter connected to the decoding unit, which can convert the restored image data into analog signals and output the analog signals.

In this case, the encoding unit includes a register for temporarily storing the (2n−1)th pixel data; a subtractor for directly receiving the (2n)th pixel data, and subtracting the (2n)th pixel data from the (2n−1)th pixel data; and an encoder for creating the header value H, the encoding value S and the reference value V based on a result of the subtraction.

The encoder takes '1' as the header value if the result of the subtraction is greater than $-2^{m-1}$ and less than $2^{m-1}-1$, and takes '0' as the header value if the result of the subtraction is less than $-2^{m-1}$ or greater than $2^{m-1}-1$. Here, 'm' is the number of bits of the result of the subtraction.

The encoder takes the result of the subtraction as the encoding value if the result of the subtraction has a positive value, and takes the complement of the result of the subtraction as the encoding value if the result of the subtraction has a negative value.

The encoder takes the (2n)th pixel data as the reference value if '1' is taken as the header value, and takes a value, including upper 5 bits corresponding to upper 5 bits of the (2n−1)th pixel data and lower 4 bits corresponding to upper 4 bits of the (2n)th pixel data, as the reference value if '0' is taken as the header value.

Meanwhile, the decoding unit includes a comparator for determining whether the header value from the storage unit is '0' or '1'; an adder connected to the comparator, which can add the reference value and the encoding value to each other; and a decoder connected to the comparator and the adder, which can restore the original data using the value, obtained through the addition by the adder, and the reference value.

Here, the adder adds the reference value and the encoding value to each other if the header value is '1', and the decoder restores the value, obtained through the addition of the encoding value and the reference value by the adder, to the (2n−1)th pixel data if the header value is '1', and restores the reference value to the (2n)th pixel data if the header value is '1'.

The decoder sequentially arranges the upper 5 bits of the reference value and the upper 1 bit of the upper 5 bits and then restores resulting data to the (2n−1)th pixel data if the header value is '0', and sequentially arranges the lower 4 bits of the reference value and the upper 2 bits of the lower 4 bits and then restores resulting data to the (2n)th pixel data if the header value is '0'. Here, the image data is one of RGB data, YUV data, and Ycbcr data.

In another aspect, there is provided an image data processing method, including the steps of: a) receiving image data, comparing (2n−1)th pixel data with (2n)th pixel data, and creating a header value, an encoding value and a reference value, which are used to encode the pixel data; b) storing the header value, the encoding value and the reference value, which are created at the step a); c) respectively decoding the (2n−1)th pixel data and the (2n)th pixel data using the header value, the encoding value and the reference value; and d) converting the data, restored at step c), into analog signals, and outputting the analog signals.

The step a) includes the steps of a-1) temporarily storing the (2n−1)th pixel data; a-2) directly receiving the (2n)th pixel data and subtracting the (2n)th pixel data from the (2n−1)th pixel data; and a-3) creating the header value, the encoding value and the reference value based on the result of the subtraction.

At the step a-3), '1' is taken as the header value if the result of the calculation is greater than $-2^{m-1}$ and less than $2^{m-1}-1$, and '0' is taken as the header value if the result of the subtraction is less than $-2^{m-1}$ or greater than $2^{m-1}-1$. In this case, 'm' is the number of bits of the result of the subtraction.

At the step a-3), the result of the subtraction is taken as the encoding value if the result of the subtraction has a positive value, and the complement of the result of the subtraction is taken as the encoding value if the result of the subtraction has a negative value.

Moreover, at the step (a-3), the (2n−1)th pixel data is taken as the reference value if '1' is taken as the header value, and a value, including upper 5 bits corresponding to the upper 5 bits of the (2n−1)th pixel data and lower 4 bits corresponding to the upper 4 bits of the (2n)th pixel data, is taken as the reference value if '0' is taken as the header value.

The step (c) includes c-1) determining whether the header value from the storage unit is '0' or '1'; c-2) adding the reference value to the reference value; and c-3) restoring original data using the value obtained through the addition by the adder and the reference value.

At the step c-2), the reference value is added to the encoding value if the header value is '1'. At the step c-3), the value, obtained through the addition of the encoding value to the reference value, is restored to the (2n−1)th pixel data if the header value is '1'.

At the step c-3), the reference value is restored to the (2n)th pixel data if the header value is '1'. Furthermore, if the header value is '0', the upper 5 bits of the reference value and the upper 1 bit of the upper 5 bits are sequentially arranged, and this resulting value is restored to the (2n−1)th pixel data, and the lower 4 bits of the reference value and the upper 2 bits of the lower 4 bits are sequentially arranged and this resulting value is restored to the (2n)th pixel data. In this case, the image data is one of RGB data, YUV data and Ycbcr data.

BRIEF DESCRIPTION OF THE DRAWINGS

The above and other features and elements will be more clearly understood from the following detailed description taken in conjunction with the accompanying drawings, in which.

DETAILED DESCRIPTION

If detailed descriptions of well-known technologies may make the gist of the following description unnecessarily vague, such detailed descriptions will be omitted.

An image data processing apparatus according to an embodiment and an image data processing method using the same will be described in detail below with reference to the accompanying drawings.

Figures 1, 2:
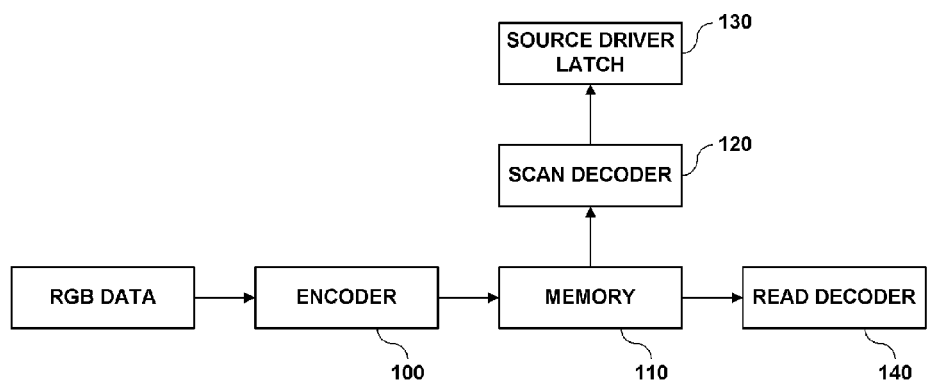
FIG. 1 is a block diagram showing a prior art image data processing apparatus.
FIG. 2 is a block diagram showing the memory of the prior art image data processing apparatus.
Figure 3:
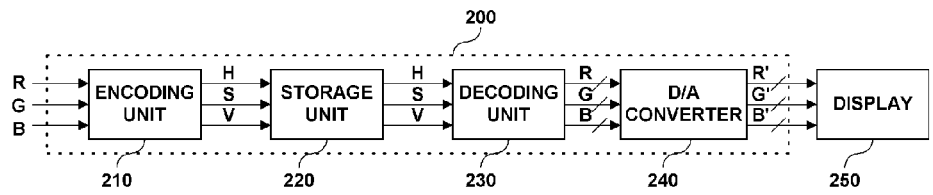
FIG. 3 is a block diagram showing an image data processing apparatus according to an embodiment.
Figure 4:
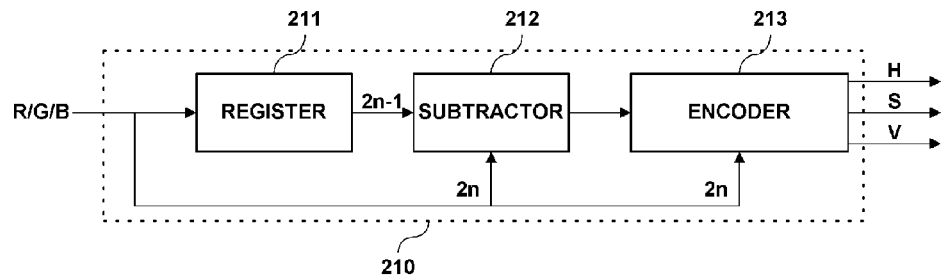
FIG. 4 is a block diagram schematically showing the encoding unit of the image data processing apparatus according to an embodiment.
Figure 5:
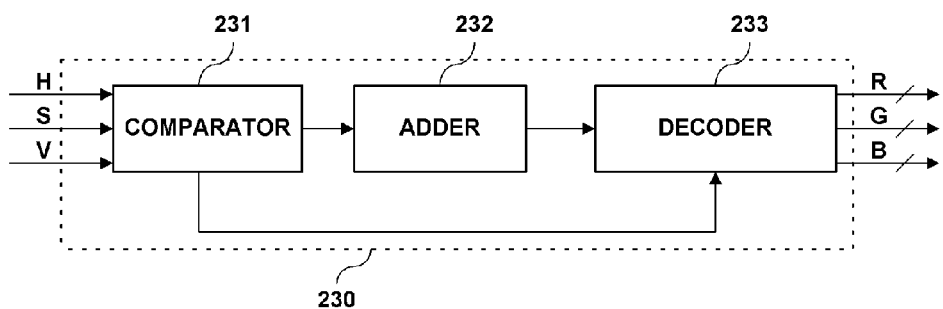
FIG. 5 is a block diagram schematically showing the decoding unit of the image data processing apparatus according to an embodiment.
Figure 6:
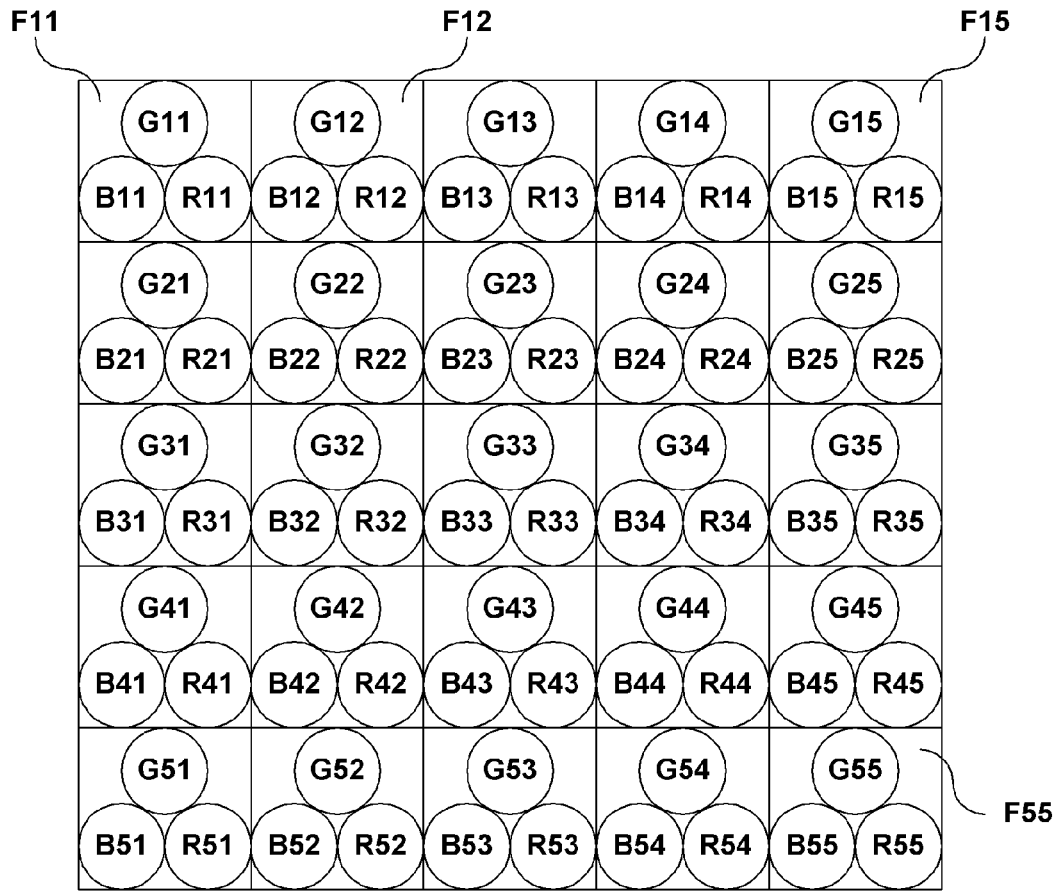
FIG. 6 is a diagram illustrating the RGB of each pixel of image data.
Figure 7:
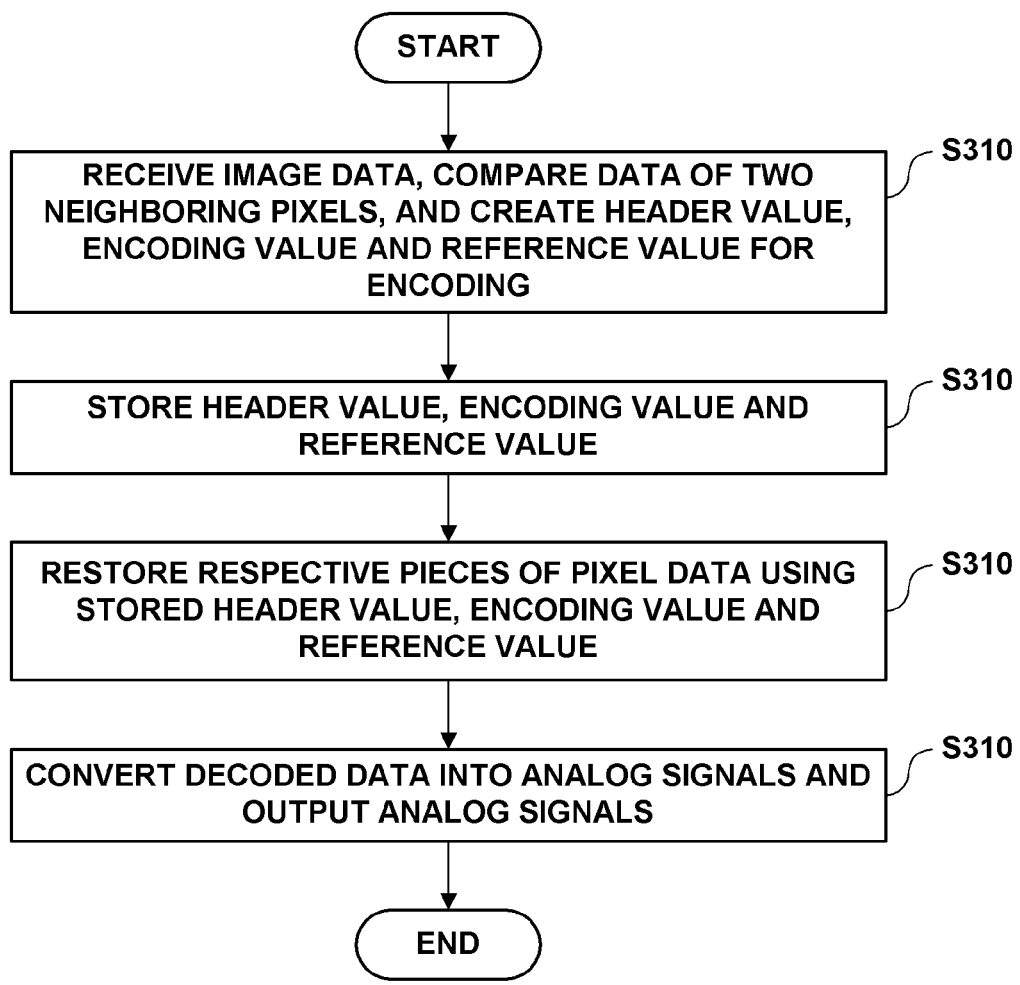
FIGS. 7 to 11 are flowcharts sequentially showing an image data processing method according to an embodiment.
Figure 8:
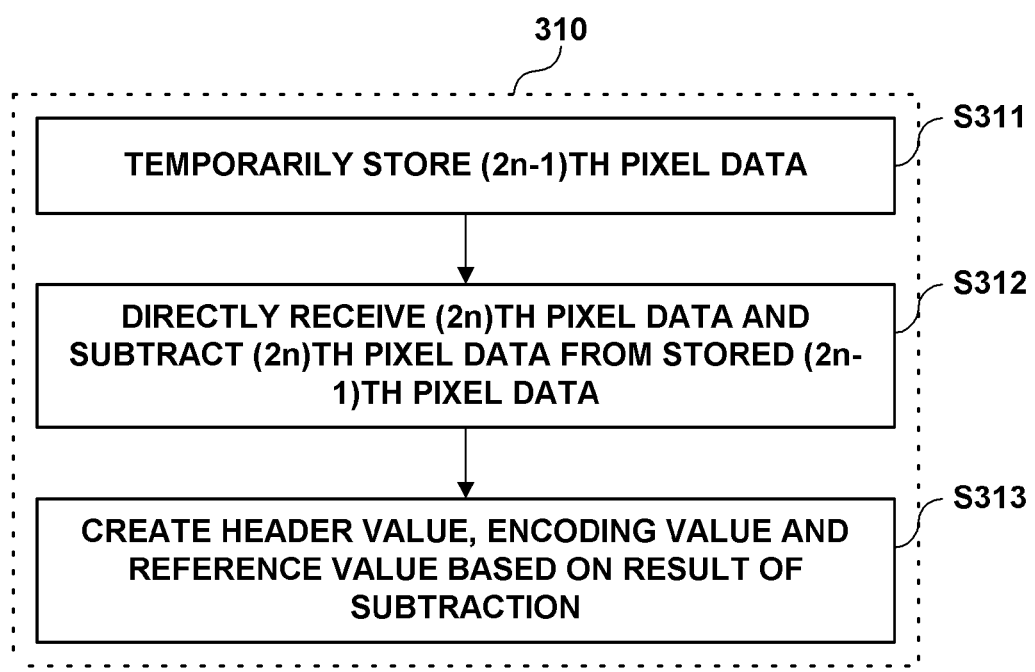

FIG. 3 is a block diagram showing an image data processing apparatus 100 according to an embodiment, FIG. 4 is a block diagram schematically showing the encoding unit 210 of the image data processing apparatus 100 according to an embodiment, FIG. 5 is a block diagram schematically showing the decoding unit of the image data processing apparatus 100 according to an embodiment, and FIG. 6 is a diagram illustrating the RGBs of each pixel of image data. FIGS. 7 to 11 are flowcharts sequentially showing an image data processing method according to an embodiment.

As shown in FIGS. 3 to 7, the image data processing apparatus 200 according to an embodiment includes the encoding unit 210 for receiving image data, comparing (2n−1)th pixel data with (2n)th pixel data, and creating a header value H, an encoding value S and a reference value V, which are used to encode the pixel data, at step S310; a storage unit 220 connected to the encoding unit 210, which can store the header value H, the encoding value S and the reference value V, which are created by the encoding unit 210, at step S320; a decoding unit 230 connected to the storage unit 220, which can restore the (2n−1)th pixel data and the (2n)th pixel data using the header value H, the encoding value S and the reference value V at step S330; and a Digital-to-Analog (D/A) converter 240 connected to the decoding unit 230, which can convert the restored image data into analog signals and output the analog signals at step S340.

Here, the encoding unit 210, as shown in FIGS. 4 to 8, includes a register 211 for temporarily storing the (2n−1)th pixel data at S311; a subtractor 212 for directly receiving the (2n)th pixel data, and subtracting the (2n)th pixel data from the (2n−1)th pixel data at step S312; and an encoder 213 for creating the header value H, the encoding value S and the reference value V based on the result of the subtraction.

For example, the register 211, as shown in FIG. 6 showing the respective pixels of the image data, temporarily stores (2n−1)th pixel data, which is data at an odd-numbered sequential position, that is, 11th pixel data R11, G11 and B11, which is the Red, Green and Blue (RGB) values of the 11th pixel F11, when the 11th pixel data R11, G11 and B11 is applied, and transmits the stored 11th pixel data R11, G11 and B11 to the subtractor 211 when (2n)th pixel data, which is pixel data at an even-numbered sequential position, that is, the 12th pixel data R12, G12 and B12 is applied. In this case, although the data of the respective pixels has been described as being RGB data, it is not limited thereto, but may be 'YUV' data or 'Ycbcr' data.

The subtractor 212 is connected to the register 211 and the encoder 213, receives the 11th pixel data R11, G11 and B11, stored in the register 211, and the 12th pixel data R12, G12 and B12 directly from the outside, and subtracts the 12th pixel data R12, G12 and B12 from the 11th pixel data R11, G11 and B11.

The encoder 213 is connected to the subtractor 212 and the storage unit 220, receives the result of the subtraction from the subtractor 212 and the 12th pixel data R12, G12 and B12 from the outside, and creates the header value H, the encoding value S and the reference value V.

Figure 9:
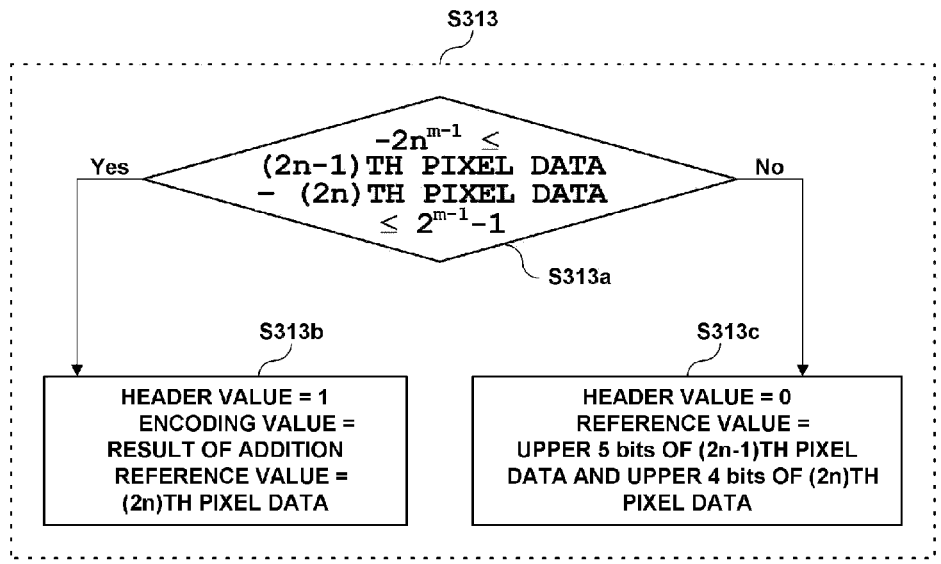

The encoder 213, as shown in FIG. 9, determines the header value H based on the result of the calculation applied from the subtractor 212. If the result of the calculation is greater than $-2^{m-1}$ and less than $2^{m-1}-1$, the encoder 213 takes '1' as the header value H at step S313b. If the result of the subtraction is less than $-2^{m-1}$ or greater than $2^{m-1}-1$, the encoder 213 takes '0' as the header value at step S313c. In this case, 'm' is the number of bits of the result of the subtraction.

The encoder 213 takes the result of the subtraction as the encoding value S. The encoder 213 takes the result of the subtraction as the encoding value S if the result of the subtraction has a positive value, and takes the complement of the result of the subtraction as the encoding value S if the result of the subtraction has a negative value.

Meanwhile, the encoder 213 takes the (2n)th pixel data, that is, the 12th pixel data R12, G12 and B12, as the reference value V if '1' is taken as the header value H, and creates the reference value V, the upper 5 bits of which have the upper 5 bits of the (2n−1)th pixel data, that is, the 11th pixel data R11, G11 and B11, and the lower 4 bits of which have the upper 4 bits of the (2n)th pixel data, that is, the 12th pixel data R12, G12 and B12, if '0' is taken as the header value H.

A procedure of encoding image data using the encoding unit 210, constructed as described above, will be described using a specific example. In this case, each piece of pixel data will be described as being data having an R component, which is obtained by excluding GB components from the RGB components of the piece of pixel data.

Assuming that the 11th pixel data R11 is '100100$_{(2)}$' and the 12th pixel data R12 is '100100$_{(2)}$', the subtractor 212 receives the 11th pixel data R11, stored in the register 211, and the 12th pixel data R12 directly, and subtracts the 12th pixel data from the 11th pixel data R11.

Since, as a result of the subtraction '100100-100100', the result '000000' is obtained, and is greater than $-2^{3-1}$ and less than $2^{3-1}-1$, the encoder 213 takes '1' as the header value H, '000' as the encoding value S, and '100100', that is, the data value of the 12th pixel data R12, as the reference value V.

Assuming that the 11th pixel data R11 is '100100$_{(2)}$' and the 12th pixel data R12 is '100101$_{(2)}$', the subtractor 212 performs the subtraction '100100-100101', and outputs the result of the calculation '−1'. In this case, since the result of the calculation '−1' is greater than '$-2^{3-1}$' and less than '$2^{3-1}-1$' the encoder 213 takes '1' as the header value H. Since the result of the calculation has a negative value, the encoder 213 takes the complement of '−1', that is, '111', as the encoding value S, and takes '100101', that is, the 12th pixel data R12, as the reference value V.

Assuming that the 11th pixel data R11 is '100100$_{(2)}$' and the 12th pixel data R12 is '100000$_{(2)}$', the subtractor 212 obtains the result of the calculation '000100' by performing the subtraction '100100-100000'. In this case, since the result of the calculation '000100' is '4' and is greater than '$2^{3-1}-1$', the encoder 213 takes '0' as the header value H, and takes '100101001' as the reference value V by assigning the upper 5 bits of the 11th pixel data R11, that is, '10010', to the upper 5 bits, assigning the upper 4 bits of the 12th pixel data R12, that is '1001', to the lower 4 bits, and sequentially arranging the assigned bits.

Accordingly, since only pixel data at an odd-numbered sequential position, that is, the (2n−1)th pixel data, and pixel data at an even-numbered sequential position, that is, the (2n)th pixel data, which neighbor each other, are used to create the header value H, the encoding value S and the reference value V, the size of the register 212 can be reduced and the encoding time can also be reduced.

Meanwhile, the storage unit 220 stores only the header value H, the encoding value S and the reference value V, which are created by the encoding unit 210, and transmits the respective stored values to the decoding unit 230 at the time of decoding the encoded image data. Accordingly, since only the space for storing the header value H, the encoding value S and the reference value V is required, the size of the storage unit 220 can be reduced.

Figure 10:
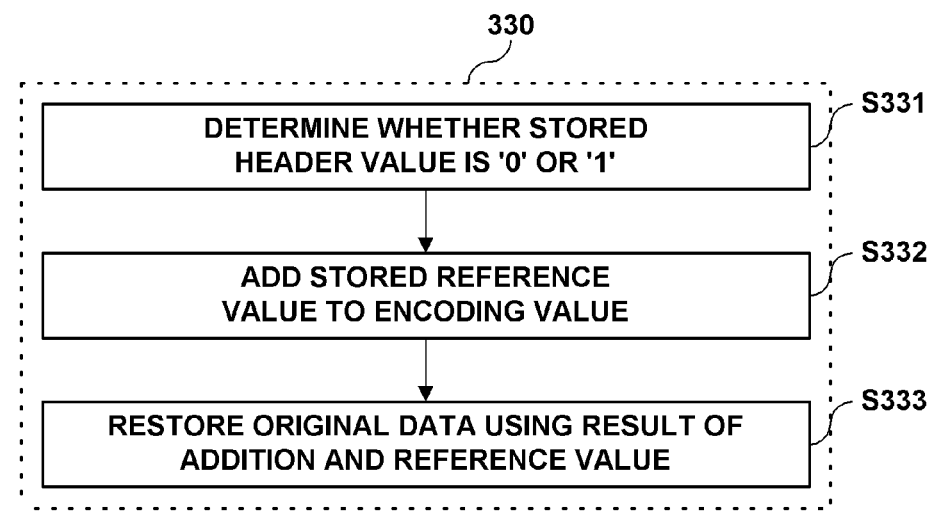
Figure 11:
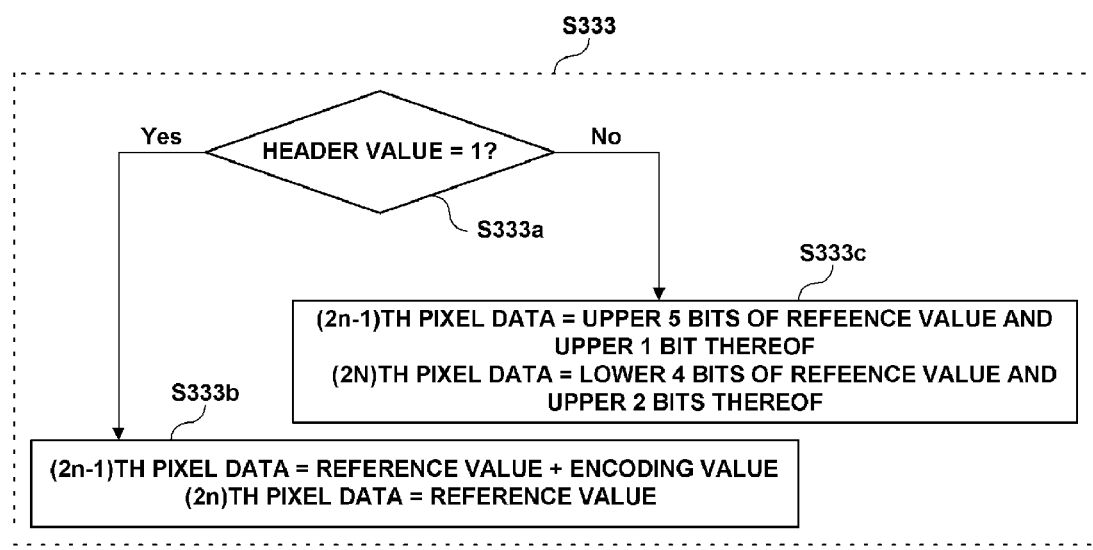

The decoding unit 230 is connected to the storage unit 220 and the D/A converter 240, includes a comparator 231, an adder 232 and a decoder 233, as shown in FIGS. 5 and 10, and restores the original data of the image data using the header value H, the encoding value S and the reference value V, which are stored in the storage unit 220.

The comparator 231 is connected to the storage unit 220 and the adder 232, and determines whether the header value H from the storage unit 220 is '0' or '1' at step S331. If the header value H is determined to be '1' by the comparator 231, the comparator 231 transmits the header value H, the encoding value S and the reference value V to the adder 232. If the header value H is determined to be '0', the comparator 231 transmits the header value H, the encoding value S and the reference value V to the decoder 233.

The adder 232 is connected to the comparator 231 and the decoder 233, adds the encoding value S to the reference value V at step S332, and transmits the result of the addition to the decoder 233.

The decoder 233 is connected to the comparator 231, the adder 232 and the D/A converter 240, and restores the original data using the value, obtained through the addition by the adder 232, and the reference value V if the header value H is '1', and restores the original data using the reference value V if the header value H is '0', at step S333.

That is, if the header value H is '1', the decoder 233 restores the value, obtained through the addition by the adder 232, to the (2n−1)th pixel data, and restores the reference value V to the (2n)th pixel data, at step S333b.

If the header value H is '0', the decoder 233 receives the reference value V from the comparator 231, sequentially assigns the upper 5 bits of the reference value V and the upper 1 bit of the upper 5 bits and then restores this value to the (2n−1)th pixel data, and sequentially assigns the lower 4 bits of the reference value V and the upper 2 bits of the lower 4 bits and then restores this value to the (2n)th pixel data, at step S333c.

A procedure of decoding image data using the decoding unit 230, constructed as described above, will be described using a specific example. In this case, each piece of pixel data will be described as being data including an R component, which is obtained by excluding GB components from the RGB components of the piece of pixel data.

If the header value H, the encoding value S and the reference value V, which are transmitted from the storage unit 220, are '1', '000000' and '100100', respectively, the comparator 231 transmits the encoding value S and the reference value V to the adder 232, the adder 232 adds the encoding value S to the reference value V and transmits the result of the addition, that is, '100100', to the decoder 233, and the decoder 233 takes the result of the calculation '100100' as the 11th pixel data and the reference value V '100100' as the 12th pixel data.

If the header value H, the encoding value S and the reference value V are '1', '111111' and '100101', respectively, the decoder 233 takes '100100', which is obtained by adding the encoding value S to the reference value V, as the 11th pixel data, and the reference value V '100101' as the 12th pixel data.

If the header value H and the reference value V are '0' and '100010111', respectively, the decoder 233 sequentially arranges the upper 5 bits of the reference value V, that is, '10001', and the upper 1 bit of the upper 5 bits, that is, '1', and then takes '100011' as the 11th pixel data, and sequentially arranges the lower 4 bits of the reference value V, that is, '0111', and the upper 2 bits of the lower 4 bits, that is, '01', and then takes '011101' as the 12th pixel data.

The D/A converter 240 is connected to the decoding unit 230, converts the image data R, G and B, decoded by the decoding unit 230, into analog signals R', G', and B', and outputs the analog signals R', G' and B'. The display 250, connected to the D/A converter 240, displays the analog signals in the form of a single image.

Accordingly, since the image data processing apparatus 200 according to an embodiment can restore all of the data of neighboring pixels using the header value H, the encoding value S and the reference value V, which are encoded using the data of the neighboring pixels, unlike the prior art apparatus, the size of the storage unit 220 can be reduced. Since the encoded data is decoded using only the header value H, the encoding value S and the reference value V, data decoding time may be reduced.

As described above, since the image data processing apparatus 200 according to an embodiment creates the header value, the encoding value and the reference value at the time of decoding the image data by comparing the data of two neighboring pixels, and decodes the encoded image data using only the created header value, the encoding value and the reference value, the size of the storage unit for storing image data can be reduced and data processing time may be reduced at the time of encoding and decoding the image data.

Although examples have been disclosed for illustrative purposes, those skilled in the art will appreciate that various modifications, additions and substitutions are possible without departing from the scope and spirit of the following claims.

What is claimed is:

1. An image data processing apparatus, comprising:
   an encoding unit, comprising:
     a register configured to receive and temporarily store (2n−1)th pixel data;
     a subtractor configured to:
       directly receive (2n)th pixel data; and
       subtract the (2n)th pixel data from the (2n−1)th pixel data; and
     an encoder configured to create a header value, an encoding value, and a reference value based on a result of the subtraction;
   a storage unit connected to the encoder, the storage unit being configured to store the created header value, the created encoding value, and the created reference value;
   a decoding unit connected to the storage unit, the decoding unit comprising:
     a comparator configured to determine whether the stored header value is '0' or '1';
     an adder connected to the comparator, the adder being configured to add the stored reference value and the stored encoding value to obtain an adder value; and
     a decoder connected to the comparator and the adder, the decoder being configured to restore the (2n−1)th pixel data and the (2n)th pixel data according to the stored header value based on the stored reference value or a combination of the stored reference value and the adder value; and
   a Digital-to-Analog (D/A) converter connected to the decoding unit, the D/A converter being configured to:
     convert the restored pixel data into analog signals; and
     output the analog signals.

2. The image data processing apparatus as set forth in claim 1, wherein, if the result of the subtraction is greater than $-2^{m-1}$ and less than $2^{m-1}-1$, the encoder takes '1' as the header value, where 'm' is a number of bits of the result of the subtraction.

3. The image data processing apparatus as set forth in claim 1, wherein, if the result of the subtraction is less than $-2^{m-1}$ or greater than $2^{m-1}-1$, the encoder takes '0' as the header value, where 'm' is a number of bits of the result of the subtraction.

4. The image data processing apparatus as set forth in claim 1, wherein, if the result of the subtraction has a positive value, the encoder takes the result of the subtraction as the encoding value.

5. The image data processing apparatus as set forth in claim 1, wherein, if the result of the subtraction has a negative value, the encoder takes a complement of the result of the subtraction as the encoding value.

6. The image data processing apparatus as set forth in claim 2, wherein the encoder takes the (2n)th pixel data as the reference value.

7. The image data processing apparatus as set forth in claim 3, wherein the encoder takes a value, including upper 5 bits corresponding to upper 5 bits of the (2n−1)th pixel data and lower 4 bits corresponding to upper 4 bits of the (2n)th pixel data, as the reference value.

8. The image data processing apparatus as set forth in claim 1, wherein, if the stored header value is '1', the adder adds the stored reference value and the stored encoding value to each other to obtain the adder value.

9. The image data processing apparatus as set forth in claim 1, wherein, if the stored header value is '1', the decoder restores the adder value to the (2n−1)th pixel data.

10. The image data processing apparatus as set forth in claim 1, wherein, if the stored header value is '1', the decoder restores the stored reference value to the (2n)th pixel data.

11. The image data processing apparatus as set forth in claim 1, wherein, if the stored header value is '0', the decoder sequentially arranges upper 5 bits of the stored reference value and an upper 1 bit of the upper 5 bits and restores resulting data to the (2n−1)th pixel data.

12. The image data processing apparatus as set forth in claim 1, wherein, if the stored header value is '0', the decoder sequentially arranges lower 4 bits of the stored reference value and upper 2 bits of the lower 4 bits and restores resulting data to the (2n)th pixel data.

13. The image data processing apparatus as set forth in claim 1, wherein the image data is one of RGB data, YUV data, and Ycbcr data.

14. A method for processing image data, comprising:
receiving and temporarily storing (2n−1)th pixel data in a register;
directly receiving (2n)th pixel data in a subtractor;
subtracting the (2n)th pixel data from the (2n−1)th pixel data;
creating a header value, an encoding value and a reference value based on a result of the subtraction by an encoder;
storing the created header value, the created encoding value, and the created reference value;
restoring the (2n−1)th pixel data and the (2n)th pixel data according to the stored header value, the restoring of the (2n−1)th pixel data and the (2n)th pixel data comprising:
determining whether the stored header value is '0' or '1';
adding the stored reference value and the stored encoding value to each other to obtain an adder value; and
restoring the pixel data based on the stored reference value or a combination of the adder value and the stored reference value;
converting the restored pixel data into analog signals; and
outputting the analog signals.

15. The method as set forth in claim 14, wherein:
the receiving and the temporarily storing of the (2n−1)th pixel data, the directly receiving of the (2n)th pixel data, the subtracting, and the creating of the header value, the encoding value, and the reference value is performed by an encoding unit, the encoding unit including the register, the subtractor, and the encoder;
the storing of the header value, the encoding value, and the reference value is performed by a storage unit connected to the encoder;
the restoring of the (2n−1)th pixel data and the (2n)th pixel data is performed by a decoding unit connected to the storage unit; and
the converting of the restored image data into analog signals and the outputting of the analog signals is performed by a digital-to-analog converter connected to the decoder.

16. An image data processing apparatus, comprising:
means for performing the method according to claim 14.

* * * * *